United States Patent [19]

Lindenthal

[11] 4,219,286
[45] Aug. 26, 1980

[54] RIGID, TORQUE TRANSMITTING, FLANGED COUPLING

[75] Inventor: Hans Lindenthal, Heidenheim-Mergelstetten, Fed. Rep. of Germany

[73] Assignee: Voith Transmit GmbH, Mulheim an der Ruhr, Fed. Rep. of Germany

[21] Appl. No.: 967,483

[22] Filed: Dec. 7, 1978

[30] Foreign Application Priority Data

Dec. 10, 1977 [DE] Fed. Rep. of Germany ....... 2755131

[51] Int. Cl.² .......................... F16D 1/00; F16L 23/00
[52] U.S. Cl. .................................... 403/338; 403/355; 85/8.3; 64/28 R
[58] Field of Search ................... 403/335, 337, 338, 2, 403/355; 64/28 R, 30 D; 85/8.3, 14

[56] References Cited
U.S. PATENT DOCUMENTS

| 2,282,641 | 5/1942 | Corey | 403/337 X |
| 2,565,579 | 8/1951 | Thorner | 64/28 R |
| 2,808,996 | 10/1957 | Delfox | 85/8.3 X |
| 3,181,411 | 5/1965 | Mejlso | 85/8.3 X |
| 3,650,533 | 3/1972 | Wennstrom | 403/335 X |

FOREIGN PATENT DOCUMENTS

| 2201539 | 10/1977 | Fed. Rep. of Germany | 403/335 |
| Ad.2729 | 10/1950 | United Kingdom | 403/337 |

Primary Examiner—Wayne L. Shedd
Attorney, Agent, or Firm—Ostrolenk, Faber, Gerb & Soffen

[57] ABSTRACT

A coupling for rigidly connecting two coaxial machine parts, like shafts, to transmit torque: The coupling includes first and second coupling halves, each having a respective end surface and the end surfaces abutting and being secured together. There are radially extending openings around the coupling and being defined by cooperatingly shaped and placed grooves in both end faces of the coupling halves. The grooves are profiled, e.g. semi-circularly or trapezoidally, thereby defining circular or hexagonal openings, respectively, when the coupling halves are secured. A removable cotter of similar profile to the opening therefor is inserted in each opening. The cotter has a slightly larger cross-section than the opening and the cotter and/or the opening in the vicinity of the cotter are deformable upon the coupling halves being brought together. Various recesses through the cotter permit deformation thereof. Alternatively, the flanges at the abutting ends of the coupling halves are weakened to deform. In certain preferred embodiments, the cotter does not extend all the way into the groove and is spaced from the bottom of the groove. In other embodiments, the cotter has longitudinal recesses extending lengthwise along it. In embodiments where the flange of the coupling halves is deformable, the flange is shaped to not contact the cotter at the bottoms of the grooves, enabling the flange to deform.

42 Claims, 13 Drawing Figures

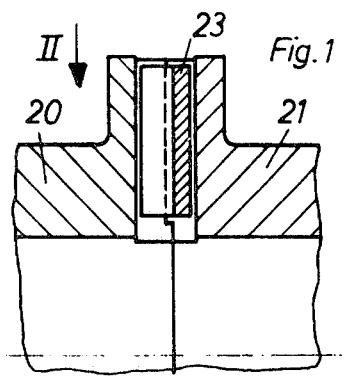
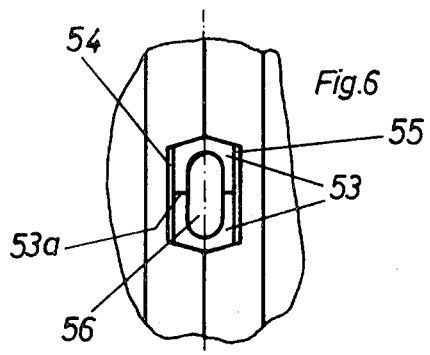
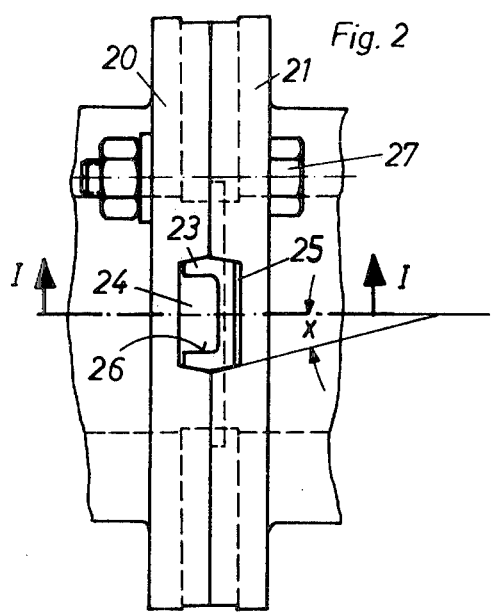
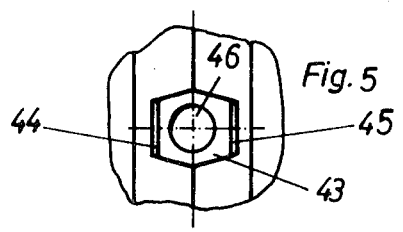
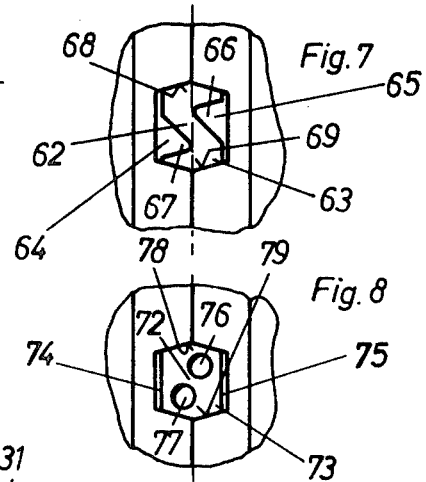
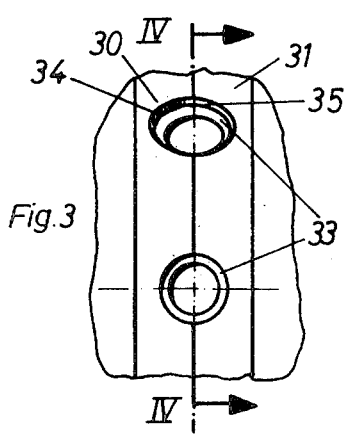
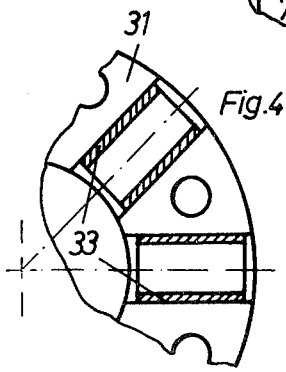
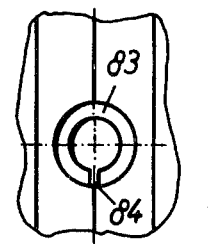

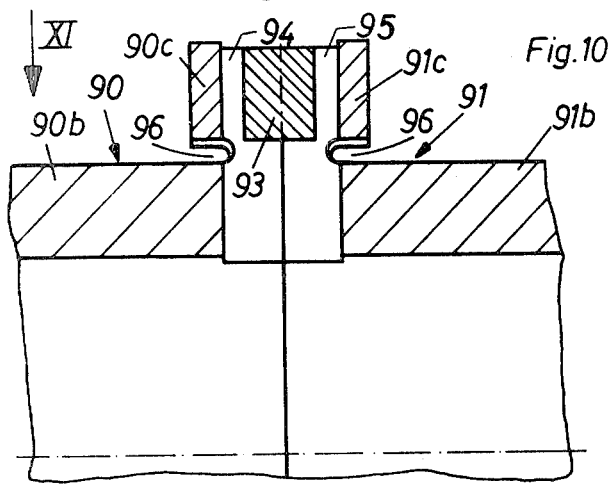
Fig.10
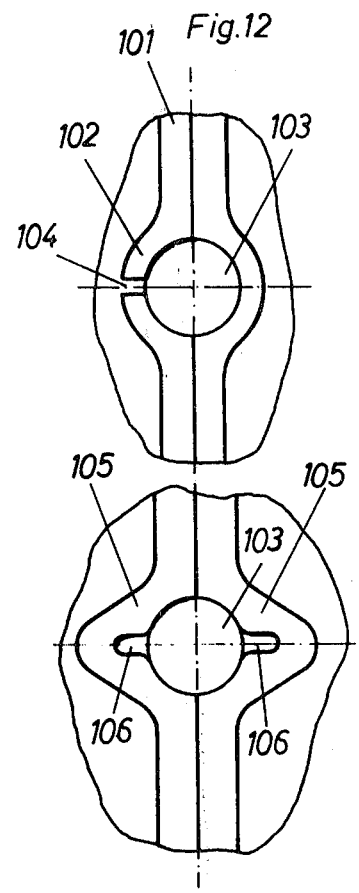
Fig.12
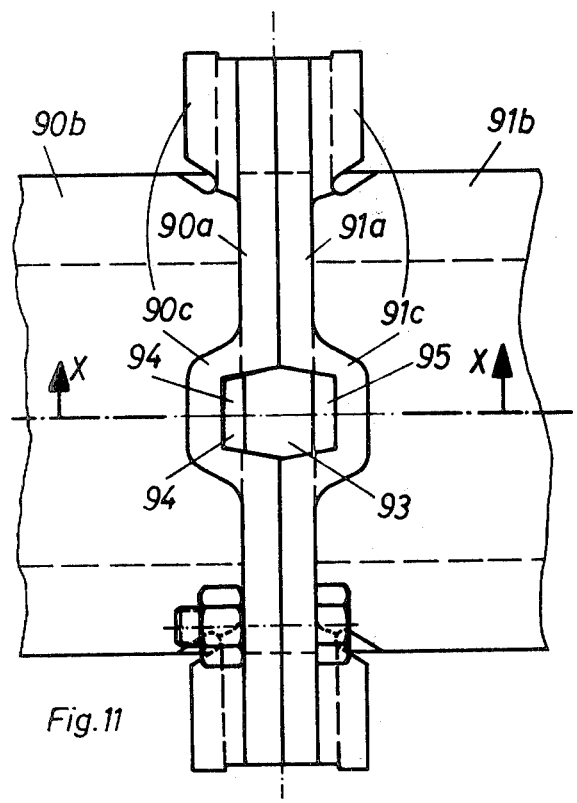
Fig.11
Fig.13

RIGID, TORQUE TRANSMITTING, FLANGED COUPLING

This invention relates to a coupling for rigidly interconnecting two coaxial machine parts, such as two shafts, adapted to transfer torque.

BACKGROUND OF THE INVENTION

A coupling of this type is a modification of the known disc coupling which includes coupling halves that are developed as flanges and are connected to each other by bolts or similar connecting elements. In a disc clutch, the transmission of torque is effected solely by frictional engagement, with tensile stressing of the connecting bolts. With such a clutch, there are limits as to the torque which can be transmitted, when in the event of constricted space, the flanges cannot be developed as large as desired.

Accordingly, various measures have become known, which are directed at increasing the torque that a coupling can transmit without having to increase the outside dimensions of the coupling. Such measures comprise, for instance, the use of fitted bolts, the provision of radial toothing (see West German Patent 440 816 and West German Offenlegungschrift No. 25 54 574) or the insertion of a cotter between the end surfaces of the coupling halves. By such measures, the frictional drive for the coupling is supplemented or replaced by a positive drive. However, these known measures have the drawbacks that they cause high manufacturing expenses and/or the couplings are very sensitive to impact stresses.

Particularly in the known coupling with a cotter that has a rectangular cross-section, it is very expensive to insert the cotter with a snug fit into the cotter receiving grooves of the coupling halves. Even if a snug fit is obtained, the cotter in all cases rests only against a single side surface of each groove during the transmission of torque. There is a danger that the cotter will move laterally in the groove upon each change in the direction of the torque. This may lead to wear, particularly when torsional oscillations are present. In order to overcome this problem, the bolts must be so dimensioned that the coupling halves are also held together by friction, as in the case of a simple disc coupling, i.e. the bolt tensile force must be at least approximately as great as if the cotter were not present.

Theoretically, the side surfaces of the cotter and of the grooves could be inclined with respect to each other so that the cross-sections of the grooves are trapezoidal and the cross-section of the cotter is accordingly hexagonal. Although in this way, the cotter would rest snugly against the side surfaces of the groove, the end surface of one coupling half would no longer rest snugly against the end surface of the other coupling half. Thus, there would be a danger that the two coupling halves would no longer be in exact alignment.

In another known coupling shown in West German Auslegeschrift No. 1 450 160, an attempt has been made to solve the foregoing problem by developing a plurality of cotters, each in the form of a conically shaped pin. However, this manner of construction requires special measure for fastening the conical pins, which would result in the danger described above. This known manner of construction is thus too expensive for many cases of use.

SUMMARY OF THE INVENTION

The object of the present invention is to provide a coupling for two coaxial parts, which rigidly interconnects these parts.

Another object of the invention is to connect these parts with a coupling that is suitable even for frequent changes in direction of the torque.

A further object of the invention is to provide such a coupling which transmits torque without it being necessary to transmit any substantial part of the torque by friction.

According to the invention, upon the connection together of the two coupling halves, one or both of the cotters, on the one hand, and the coupling halves in the vicinity of each cotter, on the other hand, are elastically deformable and are deformed by the tightening of the bolts that secure the coupling halves together, whereby the cotters are clamped to the coupling halves. In this way, the two coupling halves are clamped to each other in their circumferential direction. This provides a positive connection with initial stress.

Some advantages of the invention are that it is insensitive to torsional oscillations, that larger dimensional tolerances can be permitted in the manufacture of the grooves and cotters, and that due to the permanent positive drive in both directions of rotation, the tensile force which must be applied by the bolts can be made realtively weak. Of course, the bolts must provide the force necessary for elastically deforming the deformable ones of the cotters or the coupling halves. Nevertheless, the number of bolts can be relatively small. An additional benefit of this last mentioned feature is that the coupling of the invention is also suitable as a rapid-disconnect coupling. The coupling can, therefore, be used in preferred fashion as the connecting element between parts of a heavy cardan shaft and/or between such a cardan shaft and a primary shaft or a secondary shaft adjoining same. It is particularly advantageous to employ the coupling of the invention in connection with cardan shafts which are intended for use in driving heavy machines, for instance, rolling mills. In such cases, it is important to be able to transmit particularly high torques under high impact stresses and under very restricted conditions of space.

The aforementioned German Auslegeschrift No. 1 450 160 discloses a coupling construction in which the width of the grooves tapers from the top surface or outwardly facing side of the groove to the bottom of the groove formed in each coupling half. In that case, however, the cotters are developed as conical pins, producing the disadvantages already described above. The conical pins also have a recess which extends over their entire length. But this only serves for the passage of a fastening bolt. But, the essential idea of an embodiment of the present invention, i.e. of forming elastically deformable walls on a cotter of constant cross-section by means of a recess, is not suggested by the German publication.

Various embodiments of the coupling in accordance with the invention are described in the detailed description below.

When a cotter of approximately hexagonal outer contour is used, if the inclination of the side surfaces of the grooves amounts to about 10°, this facilitates the loosening of the coupling halves. Nevertheless, there still is a self-locking action, i.e. the circumferential force resulting from the transmission of the torque is still not converted into an axial thrust which endangers the bolt connection.

Other objects and features of the invention will become apparent from the following description of various embodiments of the invention taken with reference to the accompanying drawings.

BRIEF DESCRIPTION OF THE DRAWINGS

FIG. 1 is a partial longitudinal section through a coupling provided with an elastic cotter, and viewed along the line I—I of FIG. 2;

FIG. 2 is a view of that coupling in the direction indicated by the arrow II in FIG. 1;

FIG. 3 is a fragmentary view of another embodiment of coupling;

FIG. 4 is partial cross-section along the line IV—IV of FIG. 3;

FIG. 5 to 9 are fragmentary views showing other embodiments of couplings with an elastic cotter, corresponding to FIG. 2;

FIG. 10 is a partial longitudinal section through a coupling with a solid cotter and an elastic flange;

FIG. 11 is a view in the direction indicated by the arrow XI of FIG. 10; and

FIGS. 12 and 13 are fragmentary views of coupling embodiments which are similar to the embodiment of FIGS. 10 and 11.

DESCRIPTION OF THE PREFERRED EMBODIMENTS

Referring to FIGS. 1 and 2, a coupling according to the first embodiment of the invention comprises two coupling halves 20 and 21 of a clutch. The coupling halves have respective grooves 24 and 25 of trapezoidal cross-section which extend radially of the coupling halves. The trapezoidal grooves are shaped and placed so that the wider bases thereof overlie each other thereby defining a hexagonal opening. The angle of inclination x of the side surfaces of each of the grooves is between 5° and 10°. There are a sufficient number of grooves for, for instance, four cotters 23, to be arranged in distributed fashion around the coupling.

Each cotter is of the length of its respective radially extending groove opening 24, 25. Each cotter has a substantially hexagonal outer contour, as seen in cross-section so that the sides of the cotter will engage the side walls of its groove opening. For reasons described below, however, the side walls of the cotter are slightly wider apart than the groove side walls of the opening that receives it. The cotter side walls are resiliently deformable and the cotter is comprised of a material that permits it to have that characteristic. Furthermore, the cotter has a recess 26 along one side over its entire length so that the cotter is approximately U-shaped in cross-section. A cotter shaped in this way can be produced by extrusion.

Upon assembly of the two coupling halves 20 and 21 with the cotters 23 in their respective grooves 24, 25, the cotters are elastically deformed so that the legs of their U's are bent somewhat inward toward each other. This produces a positive lock formed with initial stress between the coupling halves. Assembly of the coupling halves is by bolts 27, one of which is shown in FIG. 2.

In the second embodiment shown in FIGS. 3 and 4, the radially extending grooves 34, 35, which are formed in the coupling halves 30 and 31 are of semi-circular cross-section. Again, the grooves 34, 35 are so placed and shaped that the bases of respective grooves 34, 35 of each pair thereof overlie thereby defining circular openings extending radially of the coupling. In this way, the grooves 34, 35 are particularly easy to produce, and may, for instance be produced in pairs by drilling. The openings defined by the groove pairs are spaced annularly around the coupling. The cotters 33 are in this embodiment formed from lengths of hollow pipe, whose outside diameter, wall thickness and material are selected so that they may be deformed and elastically compressed upon the assembly of the coupling halves 30 annd 31. This means that the elastic deformation of the cotters of this embodiment comprises a reduction in the outside diameter of the cotters, which results in the wall thickness of the cotters being correspondingly increased.

The third embodiment shown in FIG. 5 includes a radially extending cotter 43 of hexagonal outer contour which has a continuous bore hole 46 that serves as its recess. Each cotter 43 is in an opening defined by a respective pair of trapezoidal grooves 44, 45, which are similar in characteristics to grooves 24 and 25. The cotter 43 is shaped so that its sides contact the tapering side walls of the grooves 44, 45. The cotter sides are shorter than the side walls of the grooves which they engage so that the opposite sides of the cotter that face into the grooves 44, 45 do not reach to the bottom walls of those grooves. Because the cotter 43, like the cotter 23 of FIGS. 1 and 2, does not rest against the bottom walls of the grooves 44, 45 but only against the side walls thereof, the elastic deformation of the cotter 43 consists partially of compression thereof, as in the embodiment of FIGS. 3 and 4, and partially of bending.

The fourth embodiment of FIG. 6 differs from that of FIG. 5 substantially solely in that the cotter 53 is divided into two halves at a parting line 53a which extends along a radially extending plane that passes through the axis of rotation of the coupling. By shaping the cotter 53 this way, the two cotter halves can be produced by extrusion, just like the cotter of FIGS. 1 and 2. The lengths of the bottom walls of the grooves 54, 55 is larger and the bore hole recess 56 is oval in cross-section. But, other characteristics of the embodiments of FIGS. 5 and 6 are the same and are thus not repeated.

All of the embodiments described to this point have the common feature that the cotters can be loaded to the same amount in both directions of rotation of the coupling. In contrast to this, the fifth and sixth embodiments of FIGS. 7 and 8 are characterized by the wall regions of the respective cotters 63, 73, which rest against the respective side surfaces 68, 69 and 78, 79 of the grooves 64, 65 and 74, 75 serving for the transmission of the torque in a preferred direction of rotation. The side surfaces 68, 69 and 78, 79 are connected by an intermediate wall which is arranged diagonally, as seen in a cross-section through the respective cotters and their grooves. In FIG. 7, the cotter 63 has two recesses 66 and 67 located on its opposite sides facing into the grooves 64, 65 and extending radially of the coupling. The recesses are so shaped and arranged as to give the cotter 63 an approximately S-shaped cross-section. In the cotter 73 in FIG. 8, two radially extending bore holes 76 and 77 pass through the cotter at diagonally opposite locations in the cotter. The cotters 63, 73, respectively, therefore have diagonally extending walls 62 and 72. A torque due to rotation of the coupling halves in one direction will apply force along the wall 62, 72 and thereby be adequately transmitted by the cotter. A torque in the opposite direction will apply force across the wall 62, 72, causing it to bend and diminishing the torque transmission by the cotter. Thus, for optimum torque transmission, coupling rotation and application of torque in only one direction is preferred.

As already mentioned, elastic deformation of the cotters for obtaining the desired initial stressing thereof can be obtained by either or both of bending of a part of the cotter or compressing the cross-section of the cotter. Those embodiments in which the initial stressing is obtained by bending of the cotter are preferred. The tensile forces necessary for bolts, like bolts 27, in such cases are less or the wall thicknesses of the cotters can be made larger so that the specific stressing of the cotters is less under load, i.e. upon transmission of torque. For this reason, as shown in the seventh embodiment of FIG. 9, it is advantageous to modify the cotter construction shown in FIGS. 3 and 4 by slitting the tubular cotter 83 over its entire radially extending length. In this case, the slit 84 is preferably oriented to be placed along the joint between the two coupling halves. Such a slit could also be provided in a cotter of the type shown in FIG. 5.

The eighth embodiment of a coupling shown in FIGS. 10 and 11 is fundamentally different. Here, it is not the cotter 93, but the portions of the coupling halves in the vicinities of the cotters, that deform when the coupling is assembled. The coupling of FIG. 10 includes two coupling halves 90 and 91. Each coupling half carries a respective flange 90a, 91a at its end facing the other coupling half and the flanges project outwardly from their respective coupling halves. Each coupling half includes a respective annular hub 90b, 91b and the flanges 90a, 91a are at the ends of and project radially outwardly of the coupling from the respective hubs. The flanges 90a, 91a are relatively thin and deformable. There are enlarged eyes 90c and 91c formed by the respective flanges 90a, 91a, where the cotters 93 are intended to be secured. At the eyes, the flanges simply separate for defining encirclements around the cotters 93 and for defining grooves 94, 95 for the cotters. In order that the flanges 90a and 91a be able to deform elastically upon assembly of the coupling, a recess 96 is provided radially beneath each eye 90c, 91c in the transition region between the flange and hub.

The cotters 93 in this embodiment are solid, without radially extending bore holes, recesses, etc., so that the cotters do not deform when the flanges do. The cotters 93 are of hexagonal cross-section. As in the embodiments of FIGS. 5 and 6, the cotter side walls contact the side walls of the grooves 94, 95, but do not reach to the bottom walls of these grooves.

The cotters 103 of the couplings shown in the ninth and tenth embodiments of FIGS. 12 and 13 are of circular cross-section instead of being of hexagonal cross-section as in FIG. 11. In the ninth embodiment of FIG. 12, the one coupling flange 101 has, in addition to or in place of a recess which corresponds to the recess 96 of FIG. 10, a radially extending slot 104 along the flange eye 102. This facilitates deformation of the eye when the coupling halves are assembled. In similar fashion, the required deformability of the coupling flange in the tenth embodiment of FIG. 13 is provided by producing in one or both eyes 105 a recess 106 which extends radially outwardly from the bottom of the cotter receiving groove in each flange. The eyes 105 can deform to conform to the periphery of the relatively non-deformable cotter 103 when the coupling halves are attached together.

There has just been described various embodiments of couplings that include a cotter in a receiving opening defined between two attached coupling halves, wherein at least one of either the cotter or the flanges, or the like element on each coupling half that hold the cotter, are made deformable upon attachment together of the coupling halves with the cotter in place.

Although the present invention has been described in connection with the preferred embodiments thereof, many variations and modifications will now become apparent to those skilled in the art. It is preferred, therefore, that the present invention be limited not by the specific disclosure herein, but only by the appended claims.

What is claimed is:

1. A coupling for rigidly connecting two coaxial machine parts that are adapted to transmit torque, comprising:

a first and a second coupling half; said first coupling half having a respective first end surface; said second coupling half having a respective second end surface; said first and second end surfaces abutting and being clampable together;

a first groove at said first end surface; a second groove at said second end surface; said first and second grooves extending radially of said coupling and having substantially constant cross-sectional shapes over their radially extending lengths; said first groove having a respective first open top side at the respective said first end surface; said second groove having a respective second open top side at the respective said second end surface; each of said first and second grooves having a closed bottom spaced away from said top side thereof; each of said first and second grooves having respective opposed side walls that join the respective said groove top side and bottom and that generally taper toward each other moving from said top side to said bottom of the respective said groove;

said coupling halves being oriented so that said first and said second open top sides overlie one another, whereby said first and said second grooves together define a common radially extending opening; said opening extending radially of said coupling and said opening having a substantially constant cross-sectional shape over its radially extending length;

a cotter in said opening and extending radially of said coupling; said cotter having a substantially constant cross-sectional shape over its radially extending length; said cotter generally tapers narrower toward said bottom of said grooves, in conformity with the narrowing tapers of said groove walls of said opening in which said cotter is located; said cotter having a cross-section that is slightly larger than the cross-section of said opening when said coupling halves are together;

at least one between of said cotter and said coupling halves in the vicinity of said grooves being elastically deformable, such that when said end surfaces are clamped together, said cotter is squeezed by said walls of said groove and the deformable elements elastically deform.

2. The coupling of claim 1, wherein it is said the cotter is deformable, and said cotter is elastically deformable when squeezed by said groove walls.

3. The coupling of claim 2, wherein said cotter has a recess therein that extends lengthwise therealong radially of said coupling, such that said cotter may deform at and around said recess thereof.

4. The cotter of claim 3, wherein said cotter has two said recesses therein.

5. The cotter of claim 4, wherein said recesses are so placed that as said cotter presses said groove walls when said coupling halves are secured together, said recesses cause said cotter to have a diagonally extending wall extending diagonally across said opening and said cotter wall being oriented so as to have torque force between said coupling halves transmitted along said wall, when torque in one direction is applied to said coupling halves.

6. The coupling of claim 3, wherein said recess comprises a bore hole extending through said cotter, radially of said coupling.

7. The coupling of claim 6, wherein said cotter is divided into two parts at a parting line extending along a plane that extends radially of said coupling and extending across said recess, whereby the two parts of said cotter each have an approximately U-shaped cross-section.

8. The coupling of claim 7, wherein said bore hole recess passes centrally through said cotter and said parting line divides said cotter in half.

9. The coupling of claim 6, wherein said bore hole recess passes centrally through said cotter.

10. The coupling of claim 2, wherein each said groove is trapezoidal in cross-section, with the wider base of the trapezoid being at said groove top side, whereby said opening has a hexagonal cross-section.

11. The coupling of claim 10, wherein said cotter has a recess therein that extends lengthwise therealong radially of said coupling, such that said cotter may deform at and around said recess thereof.

12. The coupling of claim 11, wherein said cotter has two said recesses therein.

13. The coupling of claim 12, wherein said recesses are so placed that as said cotter presses said groove walls when said coupling halves are secured together, said recesses cause said cotter to have a diagonally extending wall extending diagonally across said opening and said cotter wall being oriented so as to have torque force between said coupling halves transmitted along said wall, when torque in one direction is applied to said coupling halves.

14. The coupling of claim 11, wherein said recess in said cotter is placed along a side of said cotter that faces toward a said groove bottom, and said cotter having an approximately U-shape, as seen in cross-section.

15. The coupling of claim 14, wherein said groove side walls are each inclined at an angle in the range of 5°-10° with respect to a plane through the axis of said coupling.

16. The coupling of claim 11, wherein said recess comprises a bore hole extending through said cotter radially of said coupling.

17. The coupling of claim 16, wherein said cotter is divided into two parts at a parting line extending along a plane that extends radially of said coupling and extending across said recess, whereby the two parts of said cotter each have an approximately U-shaped cross-section.

18. The coupling of claim 17, wherein said bore hole recess passes centrally through said cotter and said parting line divides said cotter in half.

19. The coupling of claim 10, wherein said groove side walls are each inclined at an angle in the range of 5°-10° with respect to a plane through the axis of said coupling.

20. The coupling of claim 19, wherein said cotter has a recess therein that extends lengthwise therealong radially of said coupling, such that said cotter may deform at and around said recess thereof.

21. The coupling of claim 10, wherein said cotter also has a generally hexagonally shaped outer contour.

22. The coupling of claim 21, wherein said cotter has a cross-section that is shaped so that said cotter contacts said side walls of said both grooves, but does not reach to and is spaced from said bottoms of said both grooves.

23. The coupling of claim 22, wherein said groove side walls are each inclined at an angle in the range of 5°-10° with respect to a plane through the axis of said coupling.

24. The coupling of claim 22, wherein said cotter has a recess therein that extends lengthwise therealong radially of said coupling, such that said cotter may deform at and around said recess thereof.

25. The coupling of claim 24, wherein said cotter has two said recesses therein.

26. The coupling of claim 25, wherein said recesses are so placed that as said cotter presses said groove side walls when said coupling halves are secured together, said recesses cause said cotter to have a diagonally extending wall extending diagonally across said opening and said cotter wall being oriented so as to have torque force between said coupling halves transmitted along said wall, when torque in one direction is applied to said coupling halves.

27. The coupling of claim 24, wherein said recess in said cotter is placed along a side of said cotter that faces toward a said groove bottom, so that said cotter has an approximately U-shape, as seen in cross-section.

28. The coupling of claim 2, wherein each said groove is semi-circular in cross-section, whereby said opening has a circular cross-section.

29. The coupling of claim 28, wherein said cotter has a circular outer contour to conform to said cross-section of said opening.

30. The coupling of either of claims 28, or 29, wherein said cotter has a recess therein that extends lengthwise therealong radially of said coupling, such that said cotter may deform at and around said recess thereof.

31. The coupling of claim 1, wherein each said groove is semi-circular in cross-section, whereby said opening has a circular cross-section.

32. The coupling of claim 31, wherein said cotter has a circular outer contour to conform to said cross-section of said opening.

33. The coupling of claim 1, wherein there are a plurality of sets comprised of a said first and a said second groove, defining a plurality of openings and distributed around said coupling halves.

34. The coupling of claim 1, wherein it is at least one of said coupling halves in the vicinity of said grooves that is elastically deformable.

35. The coupling of claim 34, further comprising a respective first and second coupling flange on said first and second coupling halves, and said coupling half end surfaces being defined on the respective said coupling flanges; said grooves also being defined in said coupling flanges.

36. The coupling of claim 35, wherein said cotter is substantially non-deformable.

37. The coupling of claim 35, wherein said flanges project slightly radially out of said coupling, and said grooves being in said projecting flanges.

38. The coupling of claim 35, wherein said elastic deformability of said at least one flange is accomplished by having a portion thereof that is in said groove and that is distant from said coupling half end surface, be out of contact with said cotter, thereby enabling said flange to deform.

39. The coupling of claim 35, wherein each said groove is trapezoidal in cross-section, with the wider base of the trapezoid being at said groove top side, whereby said opening has a hexagonal cross-section.

40. The coupling of claim 39, wherein said cotter has a cross-section that is shaped so that said cotter contacts said side walls of said both grooves, but does not reach to and is spaced from said bottoms of said both grooves.

41. The coupling of claim 35, wherein said cotter has a cross-section that is shaped so that said cotter contacts said side walls of both said grooves, but does not reach to and is spaced from said bottoms of said grooves.

42. The coupling of claim 35, wherein each said groove is semi-circular in cross-section, whereby said opening has a circular outer contour.

* * * * *